(12) United States Patent
Foegelle et al.

(10) Patent No.: US 7,099,970 B1
(45) Date of Patent: Aug. 29, 2006

(54) APPARATUS AND METHOD TO ENHANCE A ONE-WIRE BUS

(75) Inventors: John A. Foegelle, Broken Arrow, OK (US); Michael D. Foegelle, Cedar Park, TX (US)

(73) Assignee: Electronic Label Technology, Inc., Broken Arrow, OK (US)

( * ) Notice: Subject to any disclaimer, the term of this patent is extended or adjusted under 35 U.S.C. 154(b) by 736 days.

(21) Appl. No.: 09/825,098

(22) Filed: Apr. 3, 2001

(51) Int. Cl.
*G06F 13/00* (2006.01)

(52) U.S. Cl. ................................ 710/110
(58) Field of Classification Search ............ 717/158; 703/24–27; 710/110, 310, 314; 310/402; 700/3

See application file for complete search history.

(56) References Cited

U.S. PATENT DOCUMENTS

| | | | |
|---|---|---|---|
| 5,210,846 A | 5/1993 | Lee | |
| 5,398,326 A | 3/1995 | Lee | |
| 5,506,965 A * | 4/1996 | Naoe | 709/209 |
| 5,619,702 A * | 4/1997 | Ilic | 717/151 |
| 5,752,035 A * | 5/1998 | Trimberger | 717/153 |
| 5,761,697 A | 6/1998 | Curry et al. | |
| 5,784,624 A | 7/1998 | Douglass et al. | |
| 5,809,518 A | 9/1998 | Lee | |
| 5,862,354 A * | 1/1999 | Curiger et al. | 710/110 |
| 5,864,872 A | 1/1999 | Lee et al. | |
| 5,898,859 A * | 4/1999 | Kardach et al. | 703/23 |
| 6,034,955 A * | 3/2000 | Cho | 370/362 |
| 6,108,751 A | 8/2000 | Lee et al. | |
| 6,298,066 B1 * | 10/2001 | Wettroth et al. | 370/449 |
| 6,412,072 B1 * | 6/2002 | Little et al. | 713/200 |
| 6,463,582 B1 * | 10/2002 | Lethin et al. | 717/158 |
| 6,560,573 B1 * | 5/2003 | Scaringella et al. | 703/27 |
| 6,708,330 B1 * | 3/2004 | Moberg et al. | 717/158 |
| 2002/0046399 A1 * | 4/2002 | Debling | 717/138 |

OTHER PUBLICATIONS

Awtrey, Dan, "The 1-Wire Weather Station", Jun. 1996 [retrieved on Jun. 9, 2004]. Retrieved from the Internet: <URL: http://www.ibutton.com/weather/>.*

Awtey Dan, "Transmitting Data and Power over a One-Wire Bus", Feb. 1997 [retrieved on Jun. 9, 2004]. Retrieved from th Internet: <URL: http://www.maxim-ic.com/appnotes.cfm/appnote_number/756>.*

Lu, Yunsheng, Mao, Weiwei, Dandapani, R., and Gulati, Ravi K., "Structure and Metrology for a Single-wire Analog Testability Bus", IEEE, International Test Conference 1994 [retrieved Jun. 9, 2004].*

Moriarty, John K., Jr., Jones, R. Clifton, Dinkledine, Thomas L., "A Serial Bus Transceiver for the Automotive Environment", 1988 IEEE [retrieved Jun. 9, 2004].*

* cited by examiner

*Primary Examiner*—Wei Zhen
*Assistant Examiner*—Mary Steelman
(74) *Attorney, Agent, or Firm*—Fellers, Snider, Blankenship, Bailey & Tippens, P.C.

(57) ABSTRACT

An apparatus and method for enhancing a one-wire bus wherein a translator is inserted between a master and one or more slave devices. The translator monitors the data stream between the master and the slave device and, upon a reaching a predetermined position in the data stream, inserts known data into the data stream. The translator includes: a primary one-wire bus for communicating with the master; and at least one secondary one-wire buses each of which can communicate with one or more slave devices.

2 Claims, 10 Drawing Sheets

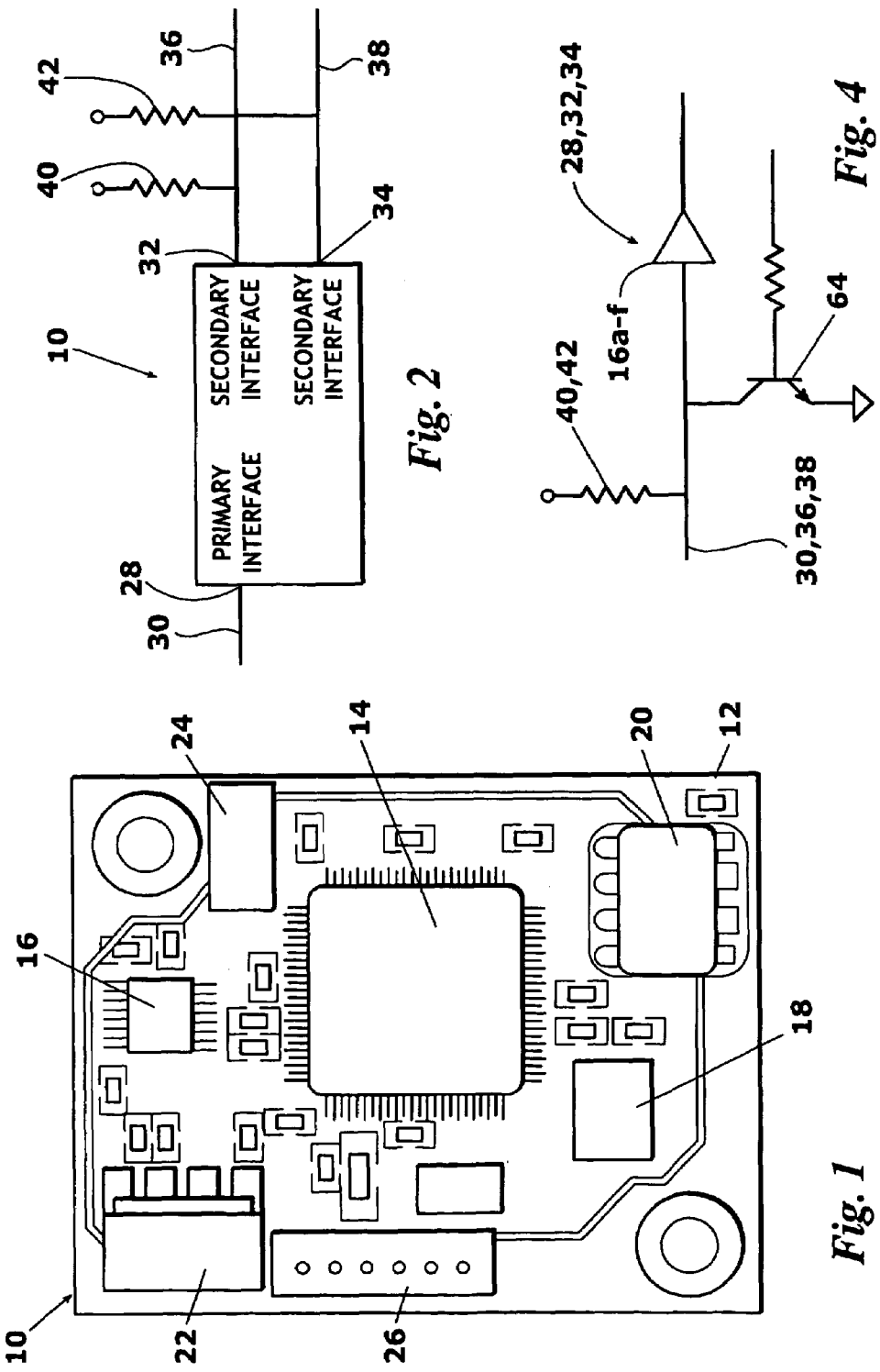

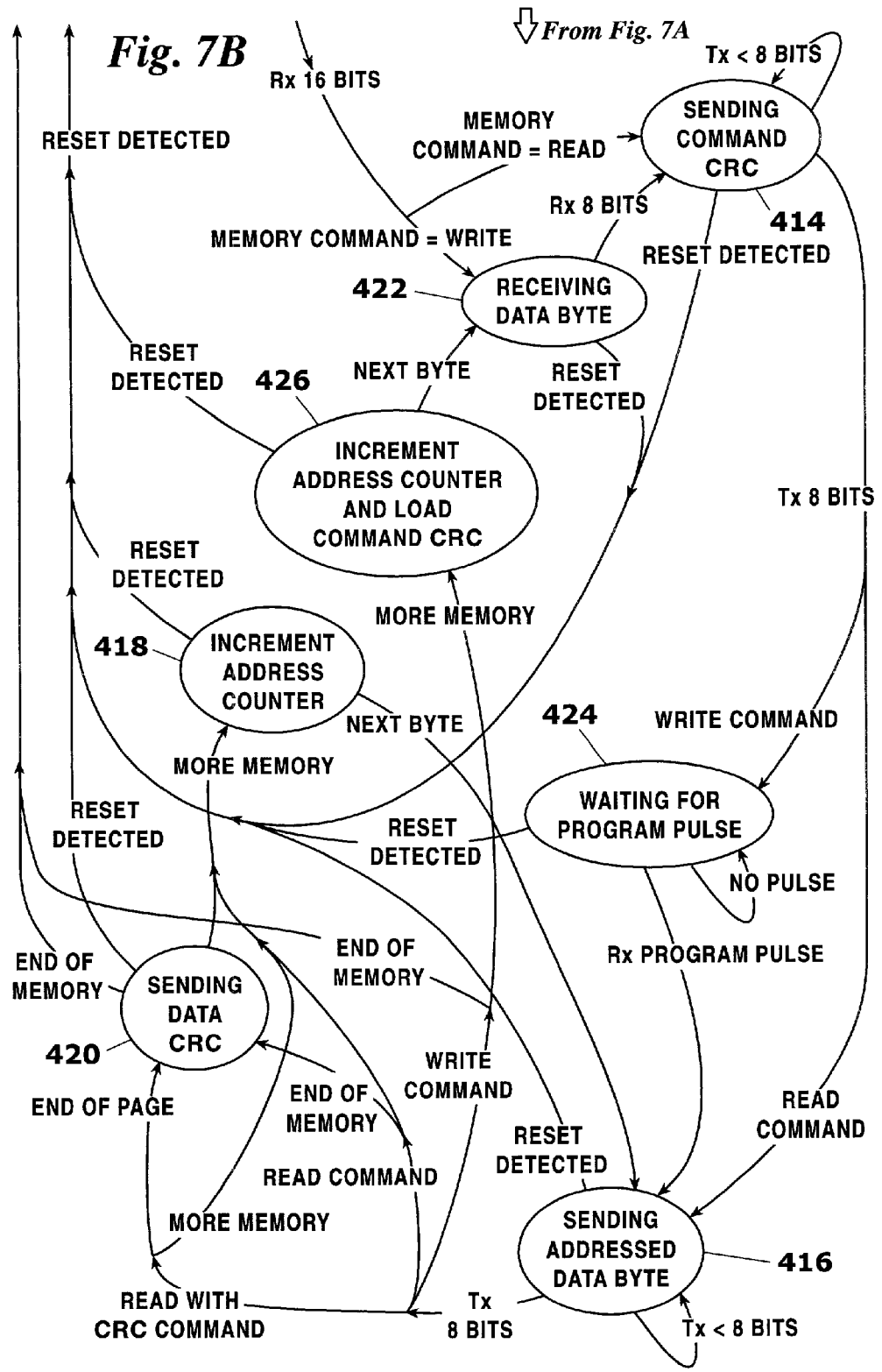

APPARATUS AND METHOD TO ENHANCE A ONE-WIRE BUS

BACKGROUND OF THE INVENTION

1. Field of the Invention

The present invention relates to a one-wire bus for serial data communication. More particularly, but not by way of limitation, the present invention relates to an apparatus and method to enhance the operation of a one-wire bus such that known data may be inserted into a data stream communicated on the bus.

2. Background of the Invention

Serial data communication schemes are well known in the art. One subset of such schemes comprises single-wire, half duplex communication schemes wherein master and slave devices may engage in the bidirectional exchange of digital information over a single channel. One particular scheme is the single-wire data bus which is the subject of U.S. Pat. Nos. 5,761,697 issued to Curry et al.; 5,210,846 issued to Lee; 5,809,518 issued to Lee; 5,864,872 issued to Lee et al.; and 6,108,751 issued to Lee. Essentially, a variation of this communication scheme has found its way into a number of commercially available semiconductor parts such as the iButton® series produced by Dallas Semiconductor of Dallas, Tex.

While this single-wire communication scheme has proven to be both inexpensive and effective as a means for the exchange of information between electronic components in a system, there is presently no method for substituting known data into the single-wire data stream. The insertion of known data into a data stream is useful for system debug, testing, software development, and the like.

In addition, as the number of devices offering a single wire interface has expanded, a need has arisen to allow device substitutions. For example, a group of smaller memory devices could be used to emulate a larger memory device or, conversely, a large memory device could be used to emulate a group of smaller devices. Presently there is no provision for such substitutions.

Yet another limitation of the one-wire bus arises when using EPROM devices. If such devices are to be programmed, voltages are required on the one-wire bus which are incompatible with other types of devices.

It is thus an object of the present invention to provide a device which can transparently insert known data into a data stream on a one-wire bus.

It is further object of the present invention to provide a method for the insertion of known data into a data stream on a one-wire bus.

It is still a further object of the present invention to provide modification of the data stream on a one-wire bus such that various slave device types may be substituted transparently to the master such that the substituted devices appear to the master as a different device or as different devices.

It is yet a further object of the present invention to simultaneously provide an unprotected one-wire bus suitable for EPROM devices and a protected one-wire bus suitable for all devices such that both buses appear to the master as a single one-wire bus.

SUMMARY OF THE INVENTION

The present invention provides a translator and a method for using the same to transparently insert known data into a data stream on a one-wire bus. The translator is placed between the master and slave devices on the bus and monitors communications on the bus to properly direct the flow of data between the master and slave devices. Upon reaching a position in the data stream where substitute data is desired, the translator inserts the substitute data while temporarily masking the actual data which would otherwise have transferred on the bus.

The translator comprises: a primary interface which communicates with the master via a primary one-wire bus; one or more secondary interfaces, each of which is capable of communicating with one or more slave devices via a secondary one-wire bus; a pulse timer for deriving various signals associated with transmissions on the bus; a CRC generator; and a data direction/isolation switch for each secondary interface.

During a read operation, the inventive translator interprets a read command issued by the master to the slave device. Upon reaching the point in the data stream where known data is desired, the translator allows the master to continue to clock the slave but the translator intercepts data from the slave and inserts in its place, known data. Preferably the known data was previously stored in the translator. It should be noted that substituted data may include information such as a family identifier, serial number, cyclic redundancy check value, and other information stored by the manufacturer, as well as user stored information.

During a write operation, the inventive translator interprets a write command issued by the master to the slave device. Upon reaching the point in the data stream where it is desired to write known data, the inventive device allows the master to continue to clock the slave but intercepts the data from the master and inserts in its place, known data.

It should be noted that the commands issued via the one-wire bus are typically integrated into the data stream. Thus, the translator may also readily modify a command issued by the master to a slave device if so desired.

In a second embodiment, the inventive translator provides a plurality of secondary one-wire busses which fanout from a primary one-wire bus between the master and the inventive device. Secondary busses may be configured to pass-through EPROM programming voltages or, alternatively, to limit the bus voltage to a level compatible with non-EPROM devices.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 1 provides a top view of a preferred embodiment of the inventive translator for enhancing a one-wire bus.

FIG. 2 provides a block diagram of the preferred embodiment of a translator for enhancing a one-wire bus.

FIG. 4 provides a schematic diagram of a typical one-wire bus interface.

FIGS. 7A–7B provides a state diagram of the preferred operational steps performed by the device for enhancing a one-wire bus.

DESCRIPTION OF THE PREFERRED EMBODIMENTS

Figure 3:
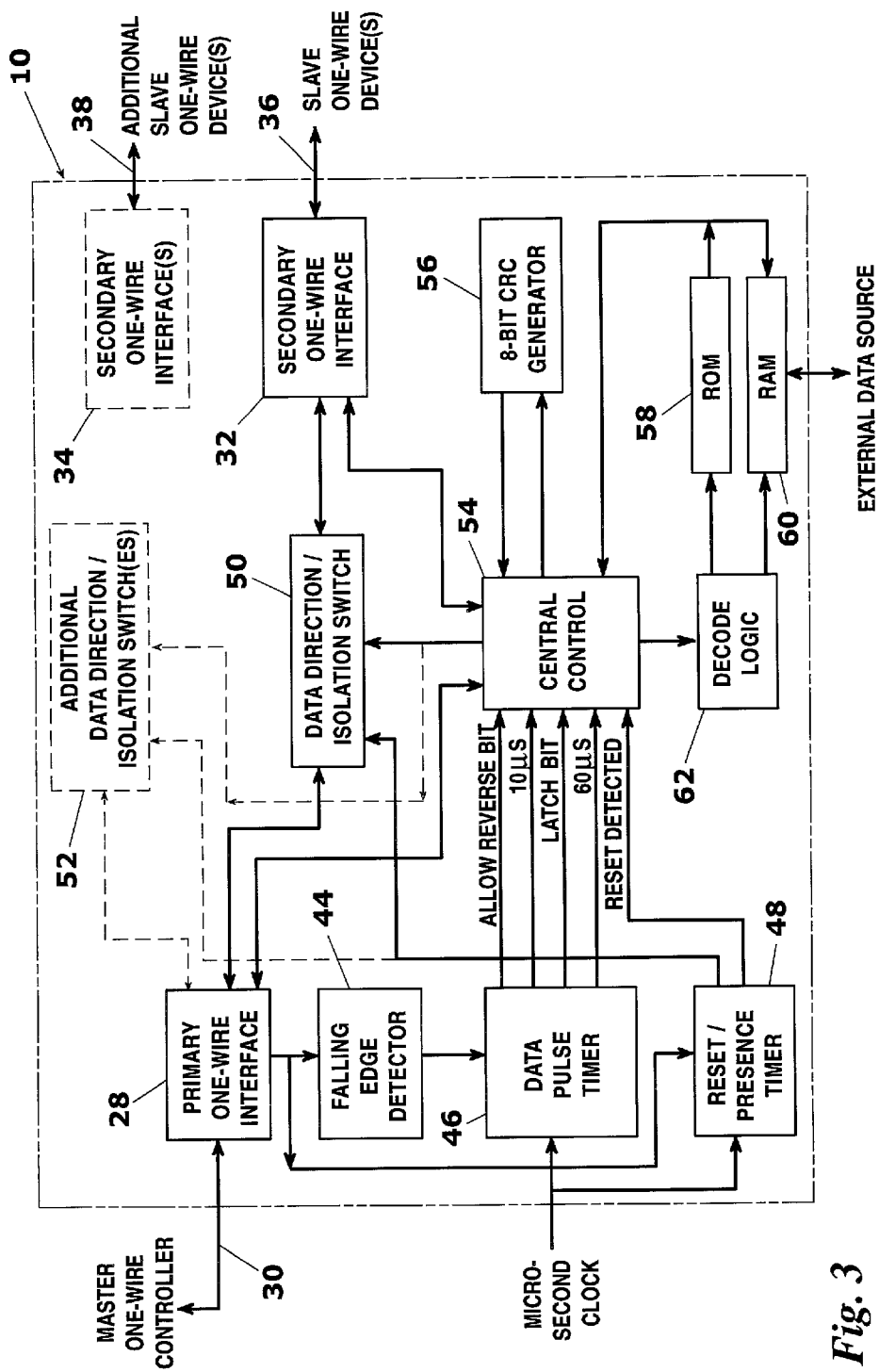
FIG. 3 provides an internal block diagram of the preferred embodiment of the inventive translator.

Depicted in FIG. 1 is a preferred embodiment of a translator 10 for enhancing a one-wire bus which includes: circuit board 12; field programmable gate array (FPGA) 14; a hex buffer 16; clock module 18; and serial memory device 20 for storing programing data for FPGA 14.

Preferably, the inventive device is mostly embodied in a single integrated circuit typically either a programmable device such as a field programmable gate array (FPGA) or a specially manufactured device such as an application specific integrated circuit (ASIC). While the preferred embodiment is shown in the accompanying figures and described as embodied in an FPGA, the invention is not so limited. By way of example and not limitation, the inventive apparatus could likewise be embodied in discrete logic or a combination of a programmed or special purpose device and discrete logic. It will also be apparent to those skilled in the art that a microprocessor or micrcontroller could be programmed to perform the operations described herein. Such embodiments are within the scope of the present invention.

In the preferred embodiment, the programming of the FPGA 14 is volatile and thus, each time power is removed from the FPGA 14, the programming information must be restored. Thus, the programming information is stored in non-volatile memory 20 and loaded into the FPGA 14 each time power is applied to the translator 10. Connectors 22, 24, and 26 supply electrical power to the translator 10 and provide connection to a master and to a slave device.

Referring next to FIG. 2, translator 10 provides a primary interface 28 for communication with a master on the primary bus 30 and one or more secondary interfaces 32 and 34 (two shown) each for communication with one or more slave devices on secondary buses 36 and 38. The number of secondary interfaces will typically correspond to the number of secondary buses incorporated in a system. It should be noted that it is the responsibility of the master to pull the one-wire bus to a logic high level. Since the secondary buses 36 and 38 may be isolated from primary bus 28, the translator must provide a pull-up resistor 40 or 42 for proper operation of the slave devices.

Referring to FIG. 3, functionally translator 10 comprises: a primary interface 28 for communication with the master; a falling edge detector 44 which detects master activity on the primary bus 30; a data pulse timer 46 which receives a 1 MHZ clock from clock module 18 (FIG. 1) to extract clock information, data, and gating information from the falling edge; reset/presence timer 48 for detecting a reset command from the master characterized by a low asserted on the primary bus 30 in excess of 480 microseconds; first and second secondary interfaces 32 and 34, respectively, for communication with slave devices; data direction/isolation switches 50 and 52 for directing the flow of data through first and second secondary busses 32 and 34, respectively; central control logic 54 which directs data flow into and out of the translator through the various interfaces 28, 32, and 34; an eight-bit cyclic redundancy check (CRC) calculator 56; and data memory 58 and 60 selected through decode logic 62.

Referring now to FIG. 4, preferably the interface 28, 32, or 34 to each one-wire bus, whether primary 30 or secondary 36 or 38, comprises: a receive buffer 16; and a transistor 64 for pulling the bus low during a transmission. In addition, each secondary bus includes a pull-up resistor 40 or 42. The CD4050, hex buffer 16 contains six individual receive buffers 16a–f which will accommodate high voltage programming pulses issued by the master to program EPROM type slave devices. In the preferred embodiment, the external buffer 16 was employed to accommodate such a programming voltage. If the inventive translator is used in a system where EPROM programming is not a concern, the receive buffers 16 could be implemented within the FPGA 14.

Data transfers on the one-wire bus are initiated by the assertion of a low or zero on the bus by the master. Clock, data, and a bus reset command are extracted from the signal appearing on the bus based on the state of the bus at various time intervals following the falling edge of a logic low transmitted on the bus by the master. Although operation of the one-wire bus will be discussed in more depth herein below as it relates to the inventive device, a complete description of the operation and precise timing of the one-wire bus is described in the iBUTTON® Book of Standards published by Dallas Semiconductor of Dallas, Tex. which is hereby incorporated by reference.

For purposes of this invention, a "low" or "zero" is defined as the voltage on the one-wire bus while the bus is pulled toward circuit ground by the output of a device on the bus (i.e., the master, slave, or the inventive device). A "high" or "one" is defined as the voltage on the one-wire bus while no device is attempting to drive the bus low and thus while the voltage level of the bus is influenced primarily by the pull-up resistor (i.e., resistor 40 or 42).

Figure 5:
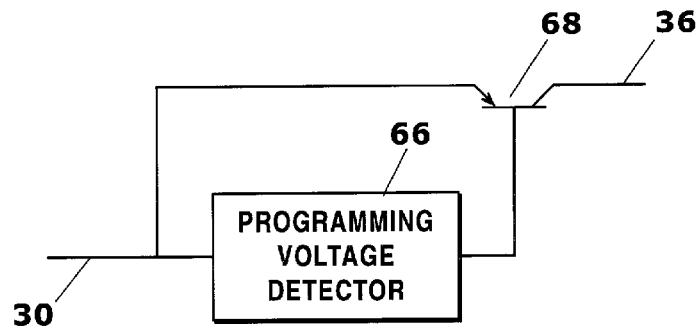
FIG. 5 provides a block diagram of a programming voltage switch as employed in the inventive translator.

As previously stated, a write operation to some slave devices requires a higher voltage on the one-wire bus, typically 11.5 volts. Referring to FIG. 5, upon reaching the point in a data stream where a write pulse is required, a high voltage is placed on the primary bus by the master. This high voltage condition is detected by comparator 66 and the high voltage pulse is gated onto the appropriate slave bus 36 by switch 68. Switch 68 is typically a transistor, MOSFET, or the like. Thus, programming pulses will be passed through from the master to the appropriate slave device.

Typical transfers on the one-wire bus include a reset pulse followed by a ROM command. The ROM command may be followed by one or more of: a) an identifier; b) a memory command; c) a memory address; and d) data. The identifier contains a family identifier, the device serial number, and data verification information. While the discussion of the operation of the preferred embodiment of the inventive device is provided in regard to the insertion of the identifier, allowing the inventive device to mimic the operation of a different device, the invention is not so limited. It will be apparent to those skilled in the art that the inventive device could be readily adapted to insert known data at any point in a data stream on the one-wire bus.

Referring again to FIG. 3, central control logic 54 decodes, or parses, individual ROM commands and directs the flow of data accordingly (as illustrated in the flow diagrams and state diagrams which follow). If a memory command is issued by the master, the central control logic separates read and write operations and directs the flow of data accordingly. Input and output from the translator as well as state transitions are directed by central control logic 54 at specific times relative to the falling edge on the primary bus. For example, data pulse timer 46 produces an output approximately 2 microseconds after the falling edge which indicates to the central control logic 54 that the slave interface 32 or 34 should be in a condition to allow the slave to pull the secondary bus 36 or 38 low. At 10 microseconds, data pulse timer 46 produces an output to central control unit 54. When substituting data to a slave device, the 10 microsecond output of timer 46 directs the secondary interface 32 or 34 to hold the secondary bus 36 or 38 low to initiate a read time slot or when writing a "one". In contrast, when writing a zero to a secondary bus 36 or 38, the bus will be held low until the end of the time slot as indicated by the data pulse timer 46 at 60 microseconds.

At 45 microseconds, the data pulse timer 46 produces an output indicating to the central control logic that data should be sampled from any of the buses during an input operation. Finally, at 60 microseconds, the data pulse timer 46 produces an output indicating that the present bit cycle has ended.

It should be noted that any number of secondary interfaces could be employed. One purpose for providing two secondary interfaces 32 and 34, as discussed herein above in regard to the preferred embodiment, would be to separate EPROM devices from other slave devices. A high voltage write pulse is placed on the one-wire bus to program an EPROM location. Unfortunately, non-EPROM slave devices are typically not tolerant of this high voltage pulse. Thus, to mix device types on a single bus, steps must be taken to protect the non-EPROM devices. Where a translator is employed, a protection scheme is not necessary since EPROM and non-EPROM devices may simply be segregated onto separate secondary buses.

It is contemplated that the circuitry embodied in the FPGA 14 will be described in a hardware descriptor language such as VHDL or Verilog. Based on the foregoing description and the discussion of the processing steps performed by the translator, the description of the circuitry in such a language is within the skill level of one of ordinary skill in the art.

Figure 9:
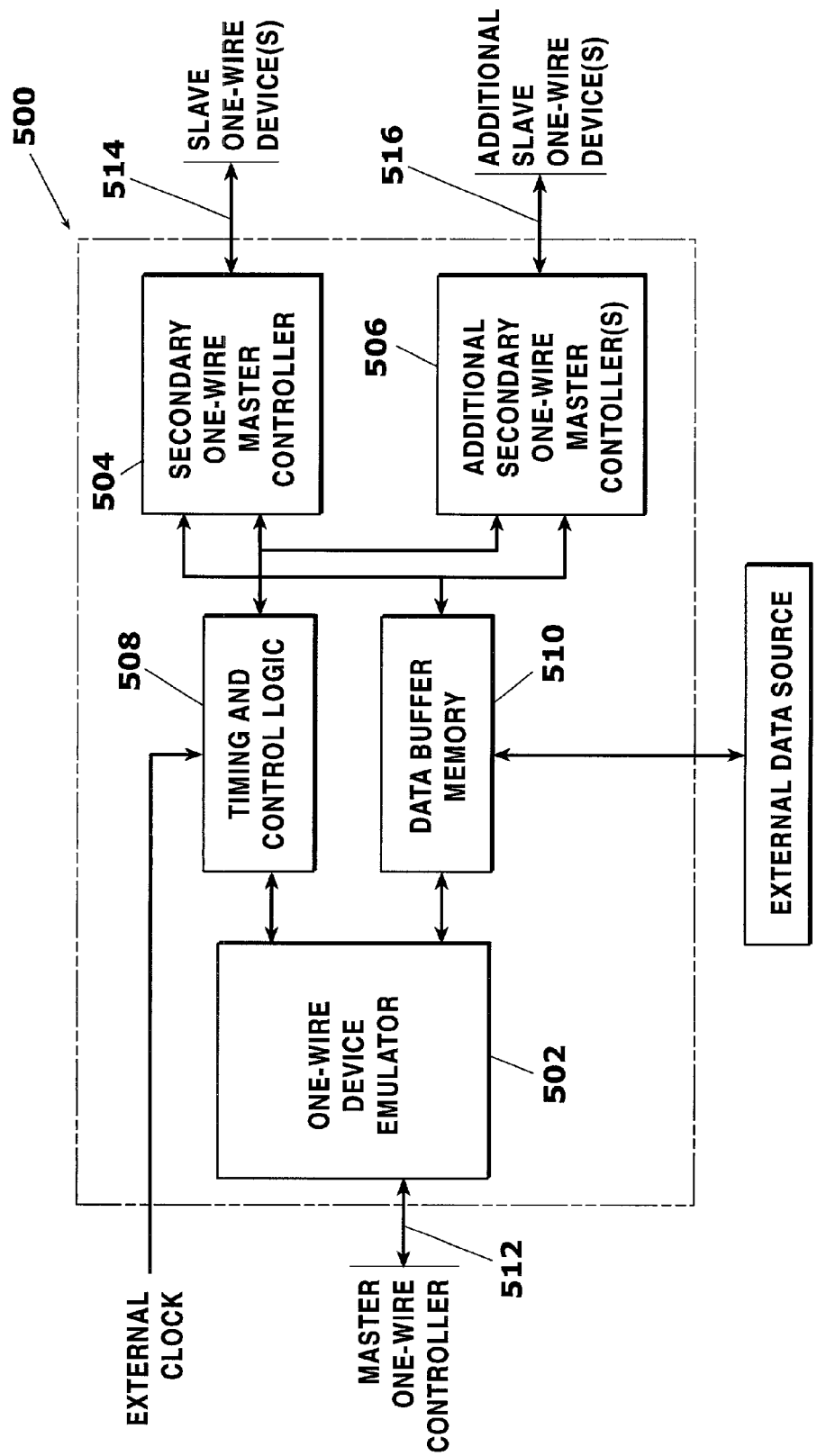
FIG. 9 provides a block diagram of an asynchronous embodiment of the inventive translator.

It should be noted that the preferred embodiment 10 has been described such that all transfers, both on the primary bus and on the secondary busses, are performed synchronously with the clock signals produced by the master. While a synchronous embodiment 10 is preferable for the method performed hereinbelow, an asynchronous embodiment could be necessary to accommodate certain other transfers (i.e. when the length of the data stream produced by the master is different than the length of the data stream expected by the slave). Referring to FIG. 9, an asynchronous translator 500 would include: a one-wire device emulator 502 in communication with a primary bus 512; one or more secondary controllers 504 and 506 (two shown) in communication with slave buses 514 and 516, respectively; timing and control logic 508; and data buffer memory 510. In a write operation, a master writes to the data buffer memory 510 through the device emulator 502 under the control of the timing and control logic 508. Upon completion of the transfer from the master, the timing and control logic 508 supervises transfer of the data to one or more slave devices from the data buffer memory 510 through secondary controllers 504 and 506. Since the transfers are performed sequentially, as opposed to the simultaneous operation of the synchronous embodiment 10, the data stream may be of unequal length.

Timing and control logic 508 controls the flow of serial data between the various buses 512, 514, and 516 as well as between the translator 500 and one or more buses 512, 514, or 516. Thus, among other things, timing and control logic 508 acts as a data direction switch to direct the flow of data over the various buses in a manner which is transparent to the master.

Device emulator 502 parses commands received from the master over primary bus 512 and responds to such commands so as to appear as a particular device (i.e., an EPROM, a RAM, or other specific device), or group of devices, to the master. The data to respond to particular commands is drawn from data buffer memory 510. Data written to data buffer memory 510 by the master is forwarded to slave devices over slave buses 514 and 516. The information presented by slave devices is temporarily stored in data buffer memory 510 for presentation to the master in response to appropriate commands received from the master.

In operation, the inventive translator 10 performs a series of steps, in conjunction with a master on a primary one-wire bus and one or more slave devices on a secondary one-wire bus, to insert known data into a data stream between the master and a slave at a predetermined position in the data stream. FIGS. 6A–D provide a flow chart depicting the steps taken by the master, by the slave device, and by a translator device for each command for which a translator response is required.

Beginning at step 300, the master initiates any transfer by first issuing a reset pulse. During an idle phase, i.e., when a previous command has completed, the translator is configured to pass primary bus activity through to the secondary buses. Thus, at step 300, the reset pulse will pass through to the secondary bus to reset all slave devices. At step 302, the translator awaits the end if the reset pulse. Upon completion of the reset pulse, at step 304 the translator reverses the data flow such that the presence pulse of attached slave devices will appear on the primary bus.

After detection of the presence pulse by the master at step 306, the master transmits a function command which is passed through the translator to the slave devices at step 308. Upon receipt of a function command from the master, the translator tests for a read ROM command at step 310, a match ROM command at step 312, a search ROM command at step 314, and a skip ROM command at step 316. If the command was not a valid command, the translator and slave devices return to await the next reset pulse.

If a read ROM command was detected at step 310, the translator responds by inserting the previously stored family code onto the primary bus at step 318 while the slave device transmits its family code on the secondary bus. At step 320, the translator likewise inserts its previously stored serial number on the primary bus while the slave device transmits its serial number on the secondary bus. Finally, at step 322, the translator inserts the CRC value on the primary bus for its inserted family code and serial number while the slave device likewise sends its CRC on the secondary bus. It should be noted that while the translator was transmitting the above mentioned 64-bit identifier on the primary bus, its was also receiving and storing the 64-bit identifier from the slave device. At step 324, if the slave CRC was valid, the translator continues processing the current data stream, otherwise, the translator returns to the idle mode, awaiting the next reset command. At step 326, the translator stores the slave 64-bit identifier so that the slave device may be identified in later operations. At step 327 if the master correctly received the 64-bit identifier from the translator in step 322, operation continues at step 328.

If a match ROM command was received at step 312, the master sends a complete 64-bit identifier consisting of the family code, serial number, and CRC value via the primary bus. The translator compares the 64-bit identifier transmitted by the master to its own, previously stored identifier in a bit-by-bit comparison. In a similar manner, the translator transmits the appropriate 64-bit identifier (previously stored, for example, at step 326) to the slave device. An example of this process is shown beginning at step 330 wherein the master sends bit 0 to the translator and the translator simultaneously transmits bit 0 to the slave device. At step 332, the translator compares bit 0 to the predetermined value for bit 0 of the family code of the translator. If, at step 332, the bit 0 sent by the master does not match the stored bit 0, the translator returns to the idle mode and awaits the next reset command from the master. If, instead, the bits match, then the process repeats for bit one at step 334 wherein the translator receives bit 1 from the master while simultaneously transmitting bit 1 to the slave device. If, at step 336, both bits match, the process continues for bit 2, otherwise, the translator returns to the idle mode awaiting another reset command. The process continues in a bit-by-bit fashion until, at step 338, bit 63 is transmitted by the master to the translator while the translator transmits bit 63 of the slave identifier to the slave device. If, at step 340, bit 63 matches, the match rom command has successfully completed and the processing continues at step 328. Otherwise, as with the other identifier bits, the translator returns to the idle mode and awaits the next reset pulse.

The search command, as discussed immediately hereinafter, allows a master to determine the address of slave devices when a plurality of slaves are simultaneously connected to the bus. Upon receiving the search ROM command, each slave and the translator first output its bit 0 value on the bus. Since the bus is pulled up, any device outputting a low will pull the bus low. Next, each device outputs the complement of its bit 0. If bit 0 was a one, the slave or translator will now output a low while if bit 0 was a zero, the slave or translator will now output a high. Again, since any device can pull the bus low, if bit 0 for any device is a one, the bus will be pulled low. Thus, if the second transmission is the complement of the first, the master has successfully detected bit 0. If both transmission are read as a low, the master knows that there are multiple devices and bit 0 varies among at least two devices. In the next time frame, the master then transmits either a one or a zero. The devices which have an identifier bit 0 of the same value as transmitted by the master remain in the search while devices for which bit 0 differs return to the idle mode. The process repeats for each of the 64 bits in the identifier. It should be noted that the master can simply reissue the search command and follow the opposite path for each contingency until the identifier for each connected slave device or translator has been determined.

If a search command was received at step 314, the translator transmits bit 0 of its predetermined identifier on the primary bus while the translator receives bit 0 of the slave identifier from the slave at step 344. In the next time frame of step 344 the translator transmits the complement of bit 0 of its predetermined identifier to the master while receiving the complement of bit 0 of the slave identifier from the slave device. In the third time frame of step 344, the master transmits a bit 0 to the translator and the translator sends bit 0 of the slave identifier to the slave. If, at step 346, the bit 0 received from the master matches the bit 0 transmitted by the translator, the search continues for bit 1 at step 348. Otherwise, the translator returns to the idle state and awaits the next reset command.

The process repeats for bit 1 at step 348. In the first time frame of step 348, the translator transmits bit 1 of its identifier to the master while receiving bit 1 of the slave's identifier from the slave device. In the second time frame of step 348, the translator transmits the complement of bit 1 to the master while receiving the complement of bit 1 from the slave. In the final time frame of step 348, the master transmits bit 1 to the translator and the translator transmits bit 1 to the slave. If, in step 350, the bit 1 received from the master does not match the bit of the translator's identifier, then the translator returns to the idle mode to await the next reset command.

If, in step 350, the bit 1 received from the master does match bit 1 of the translator's identifier, the bit-by-bit processing continues until, at step 352, bit 63 is finally transmitted. As step 352, in the translator first transmits bit 63 of its identifier to the master while receiving bit 63 of the slave's identifier from the slave. In the second time frame of step 352, the translator transmits the complement of bit 63 of its identifier while receiving the complement of bit 63 of the slave's identifier from the slave device. Finally, in the third time frame of step 352, the translator receives bit 63 from the master while transmitting bit 63 of the slave's identifier to the slave device. If, at step 354, the received bit 63 matches bit 63 of the translator's identifier, the translator stores the slave address at step 356 and processing continues at step 328, otherwise the translator enters its idle state awaiting the next reset command.

If a skip command was received at step 316, the translator and slave device are addressed without further identification and thus, the process proceeds directly to step 328.

At step 328, the master sends a memory function command which the translator passes through to the slave device to begin the transfer of additional data to or from the slave device. Next, the master sends a 16 bit address which is likewise passed through to the slave device at step 358. If the command at step 328 is a read command, at step 360 the process is directed to step 362 where the data flow is reversed so that the slave can send data directly to the master. The transfer of data through the translator continues at steps 362 and 364 until a reset command is received at which time the process returns to step 300.

If the command at step 328 is a write command, at step 356 the process is directed to step 366 where a data byte is received from the master and passed through the translator to the slave device. At step 368, the translator reverses the data flow for the next eight bits so that the slave response will be transmitted directly to the master. At this step, the slave response is a CRC value calculated from the previous four bytes transmitted by the master (function command, address, and data. At step 370, if the master receives a valid CRC, the master responds by issuing a write pulse at step 372. The translator reverses the data flow after the write pulse to allow the slave device to transmit the programmed byte to the master at step 374. If the master determines that the byte was correctly programmed at step 376 and that additional programming is required at step 378, the process is returned to step 366. If the CRC was invalid at step 370, the device programmed incorrectly at step 376, or no additional programming is required at step 378, the process returns to step 300.

Figure 7A:
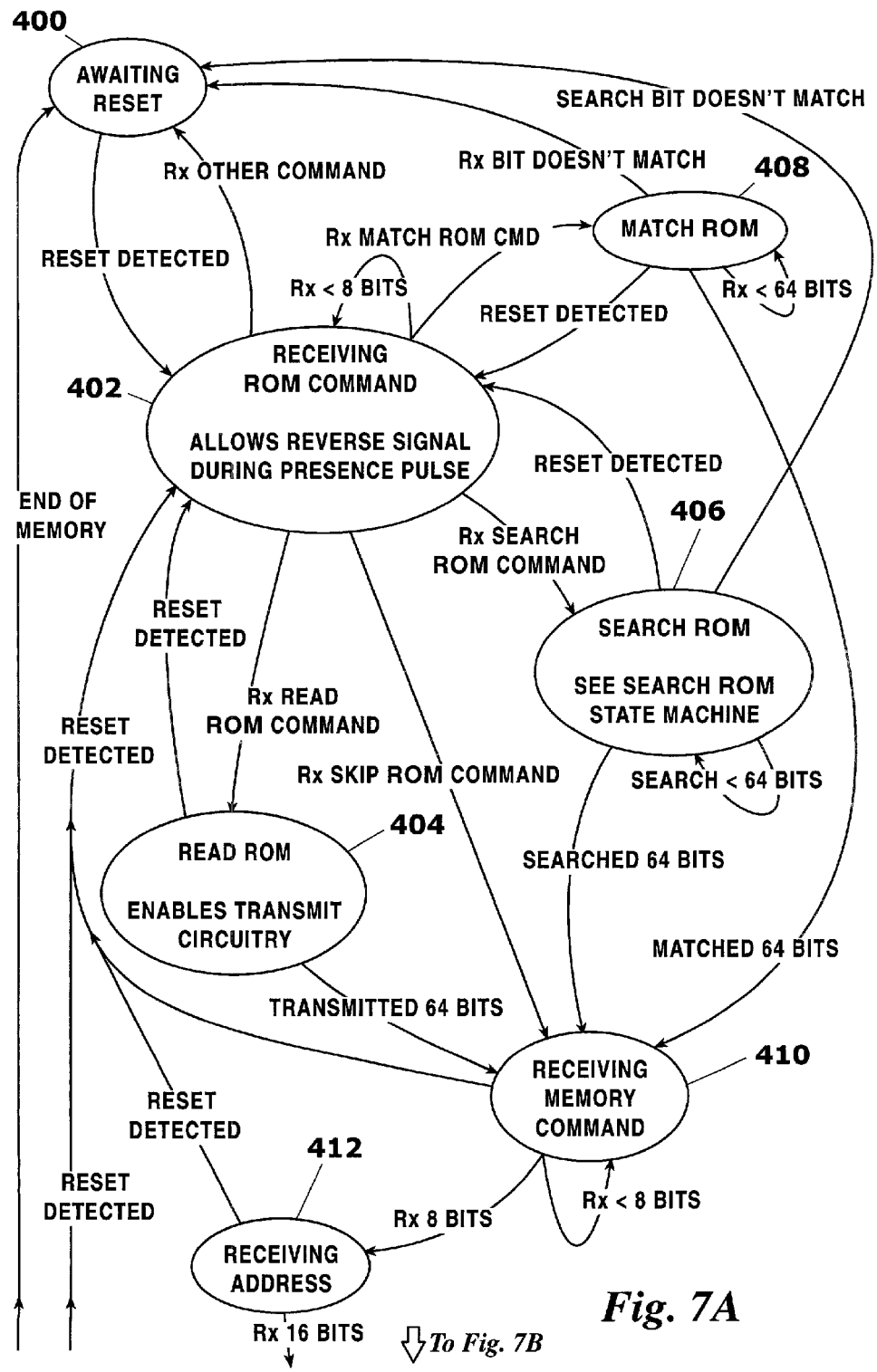

FIGS. 7A–7B depicts an alternate embodiment of the inventive device in the form of a state machine which performs a slightly different process than the one described in FIGS. 6A–6D. The device of FIGS. 7A and 7B processes memory commands, as well as ROM commands, to allow the translator to substitute known data in response to a memory command. Beginning at step 400, the process idles until a reset is received. Next at step 402, a ROM command is received which directs the flow through one of four alternate paths, a read ROM command at step 404, a search ROM command at step 406, a match ROM command at step 408, or a skip ROM command which requires no further address processing. If successful addressing occurs through one of these paths, the paths converge at step 410 wherein the translator receives a memory command followed by an address at step 412. If the command at step 410 was a read command, the read process includes the steps of sending a command CRC at 414, sending a data byte at step 416, and incrementing an address counter at 418. Steps 416 and 418 continue in a loop-wise fashion until a reset is received. If a CRC is requested with the read command, a CRC is inserted into the data stream at step 420.

If, on the other hand, the command received at step 410 was a write command, the slave device receives a data byte at step 422 and responds with a CRC value at step 414. The CRC is followed by a program pulse from the master at step 424 and the slave sends the data byte back to the master for verification at step 416. If additional data is to be transferred, the address is incremented at 426 and the process returns to step 416. It should be noted that any step which does not complete successfully returns the process to step 400.

Figure 8:
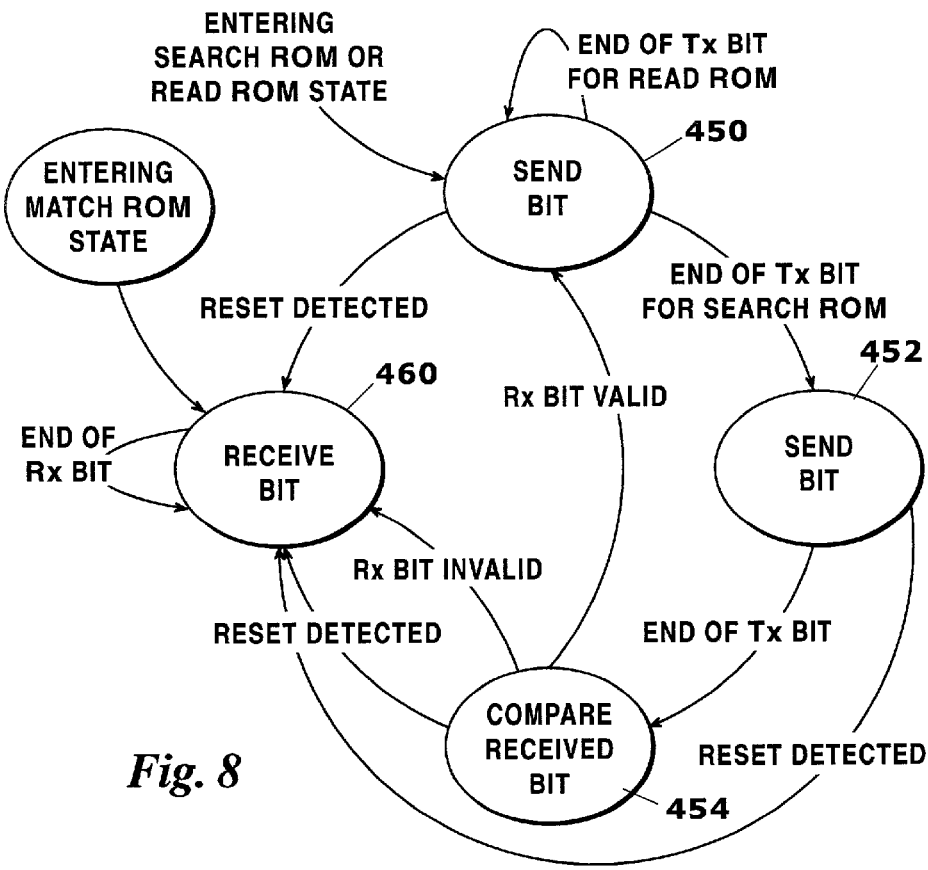
FIG. 8 provides a state diagram for ROM commands requiring address processing.
Figure 6A:
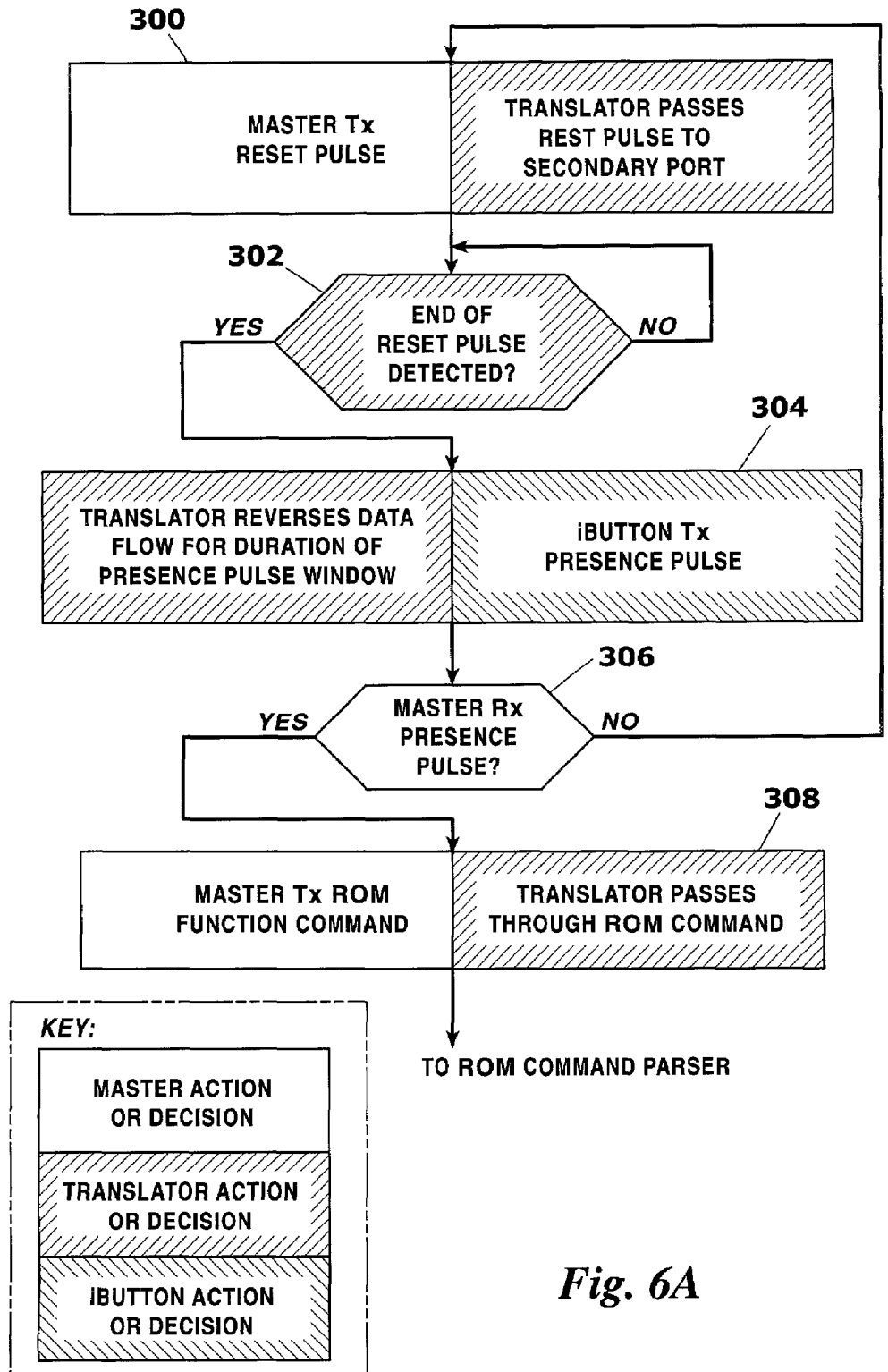
FIGS. 6A–D provide a flow chart of the preferred method for inserting data into a data stream on a one-wire bus.
Figure 6B:
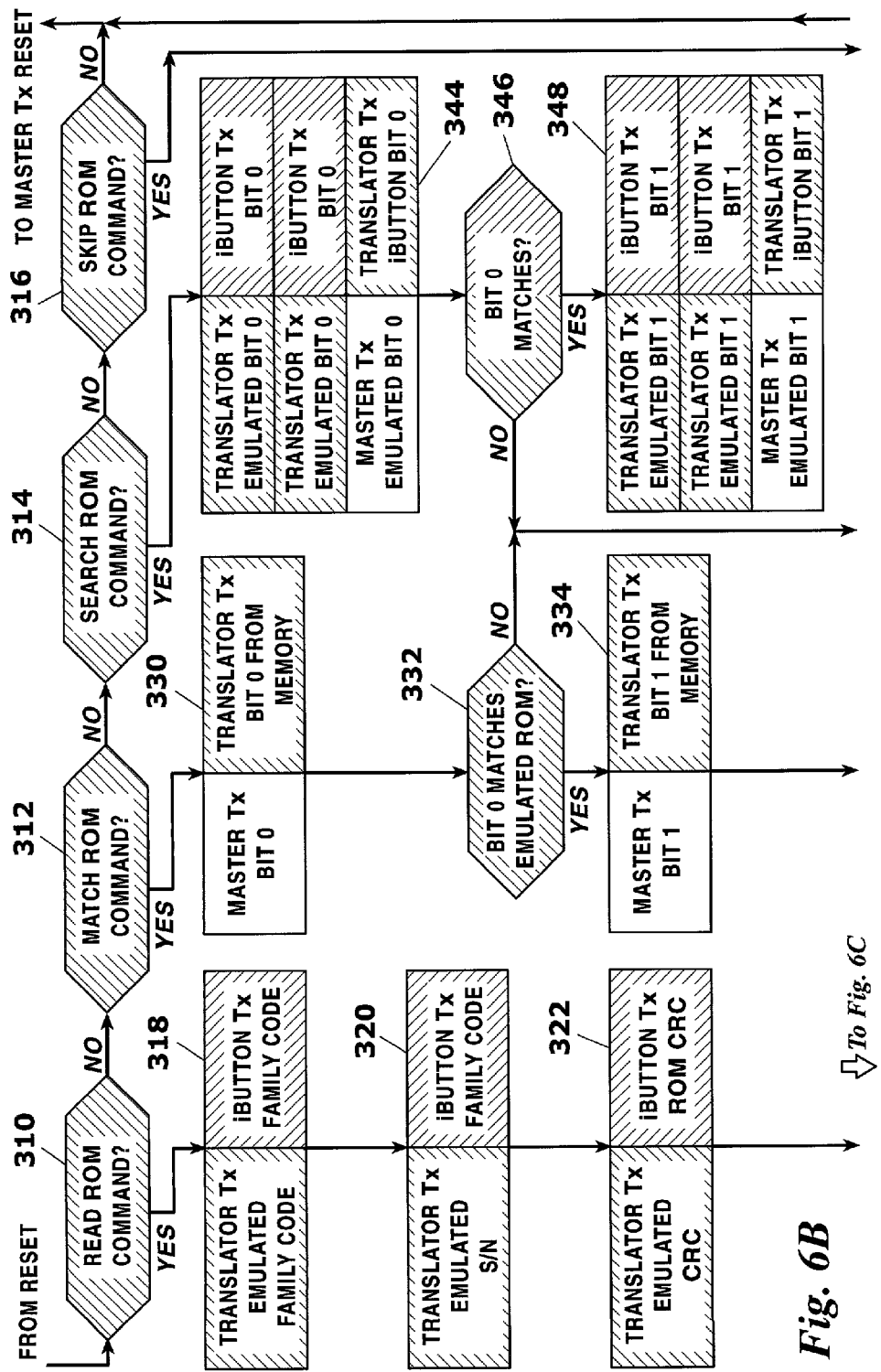
Figure 6C:
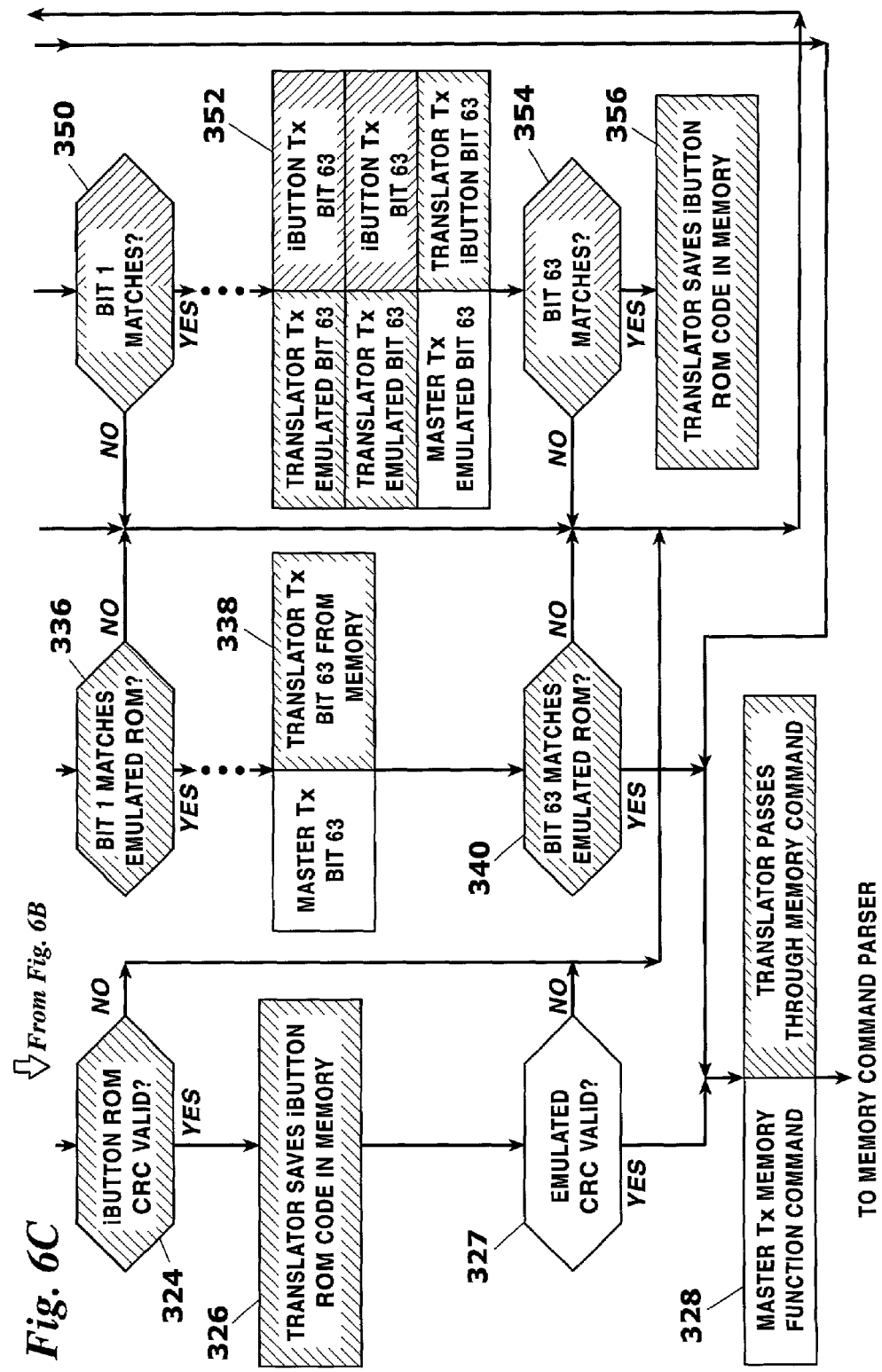
Figure 6D:
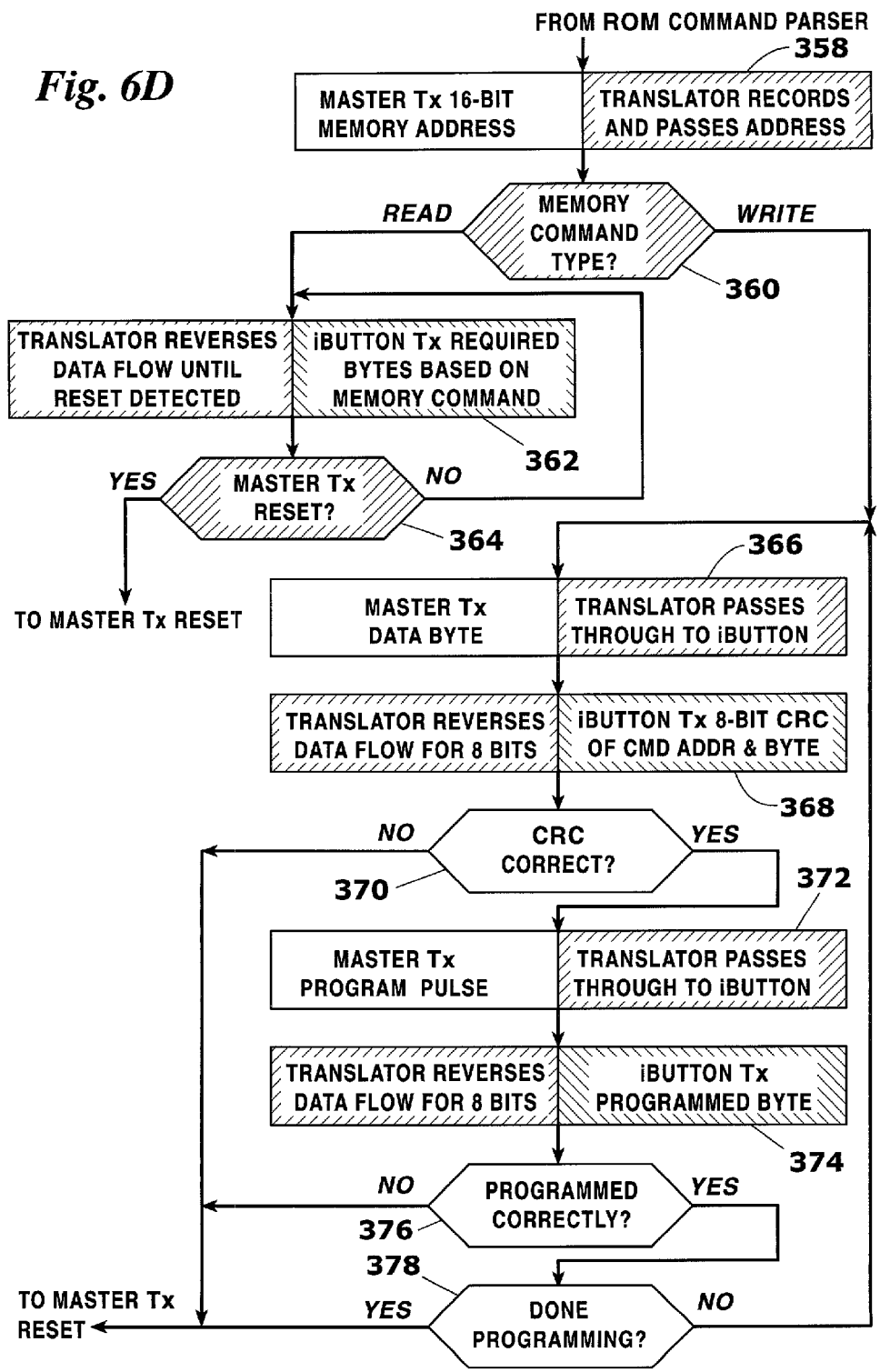

The bit-by-bit state of the translator 10 for each command is depicted in FIG. 8. For a search or read command, the process begins at step 450 wherein the translator sends a bit of its identifier. If the command is a search command, the process continues at step 452 wherein the translator sends the complement of the bit sent in step 450 and then to step 454 wherein the translator compares a bit received from the host to the bit sent in step 450. The process continued for the lesser of the entire 64 bit identifier or until the received bit does not match the transmitted bit.

The bit-by-bit state of translator 10 for a match command begins at step 460 wherein an identifier bit is received from the master. The process continues for each bit of the 64 bit identifier.

As will be apparent to those skilled in the art, the above described processes could be performed in software by a computing device such as a microprocessor or microcontroller. While the preferred embodiment of the apparatus for performing this process was described with regard to the performing of the process in programmable logic, the invention is not so limited. Thus, an embodiment wherein any or all of the steps of the inventive process are performed in a computer program is within the scope of the present invention.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An enhanced one-wire bus for the half duplex transmission of serial data between a master and a slave comprising:
    a translator having a primary interface, a secondary interface, and data storage;
    a primary one wire bus in electrical communication with said primary interface and with the master;
    a secondary one wire bus in electrical communication with said secondary interface and the slave device, wherein,
    when said translator is in a first operational mode, said primary interface is in electrical communication with said secondary interface such that serial data on said primary one wire bus is communicated to said secondary one wire bus,
    when said translator is in a second operational mode, said primary interface is in electrical communication with said secondary interface such that serial data on said secondary one wire bus is communicated to said primary one wire bus, and
    when said translator is in a third operational mode, said primary interface is in electrical communication with said secondary interface such that at least a portion of a serial data message transmitted on said secondary bus is replaced by data stored in said data storage as said serial data message is communicated to said primary one wire bus.

2. A method for inserting known data into a data stream between a master and a slave device bus including the steps of:
    (a) providing a primary one-wire bus in electrical communication between the master and a translator;
    (b) providing a secondary one-wire bus in electrical communication between the slave and said translator;
    (c) waiting for a reset pulse on said primary one-wire bus;
    (d) receiving a ROM command at said translator on said primary one-wire bus;
    (e) determining if said ROM command is a read command, a match command, a search command, or a skip command;
    (f) if said ROM command is a read command, performing the steps of:
        (i) from said translator, transmitting predetermined data on said primary one-wire bus; and
        (ii) returning to step (c)
    (g) if said ROM command is a match command performing the steps of:
        (i) at said translator, receiving an identifier on said primary one-wire bus;
        (ii) comparing said received identifier to a first predetermined identifier; and
        (iii) proceeding to step (j)
    (h) if said ROM command is a search command performing the steps of:
        (i) from said translator, transmitting the first bit of a second predetermined identifier having a plurality of bits on said primary one-wire bus;
        (ii) from said translator, transmitting the complement of said first bit of said second predetermined identifier on said primary one-wire bus;
        (iii) at said translator, receiving a bit on said primary one-wire bus; and
        (iv) comparing said received bit to said first bit of said second predetermined identifier;
        (v) repeating steps (h)(i) through (h)(iv) for each bit of said plurality of bits; and
        (vi) proceeding to step (j);
    (i) if said ROM command is a skip command proceeding to step (j);
    (k) at said translator, receiving a memory command from said primary one-wire bus;
    (k) at said translator, receiving a memory address from said primary one-wire bus;
    (l) if said memory command is a read command performing the steps of:
        (i) at said translator, receiving slave data on said secondary one-wire bus;
        (ii) from said translator, transmitting said slave data on said primary one-wire bus;
        (iii) repeating steps (l)(i)–(l)(ii) until a reset pulse is received on said primary one-wire bus;

(iii) returning to step (d);
(m) if said memory command is a write command, performing the steps of:
  (i) at said translator, receiving slave data on said primary one-wire bus;
  (ii) from said translator, transmitting said slave data on said secondary one-wire bus;
  (iii) at said translator, receiving verification data on said secondary one-wire bus;
  (iv) from said translator, transmitting said verification data on said primary one-wire bus;
  (v) at said translator, receiving a write pulse on said primary one-wire bus;
  (vi) from said translator, transmitting a write pulse on said secondary one-wire bus;
  (vii) at said translator, receiving said slave data on said secondary one-wire bus;
  (viii) from said translator, transmitting said slave data on said primary one-wire bus;
  (ix) repeating steps (m)(i)–(m)(viii) until a reset pulse is received on said primary one-wire bus;
  (x) returning to step (d).

* * * * *